United States Patent [19]

Rylander

[11] Patent Number: 4,457,037
[45] Date of Patent: Jul. 3, 1984

[54] SPHERE LAUNCHING APPARATUS

[76] Inventor: Nicholas M. Rylander, 4501 E. 45th St., Tulsa, Okla. 74135

[21] Appl. No.: 422,364

[22] Filed: Sep. 23, 1982

[51] Int. Cl.³ .............................................. B08B 9/04
[52] U.S. Cl. ............................. 15/104.06 A; 137/268
[58] Field of Search .................... 15/3.5, 3.51, 104.05, 15/104.06 R, 104.06 A, 104.06 B; 134/8; 137/268

[56]  References Cited

U.S. PATENT DOCUMENTS

| | | | |
|---|---|---|---|
| 2,981,335 | 4/1961 | Buey et al. | 15/104.06 A |
| 3,081,472 | 3/1963 | Van Dijk | 15/104.06 A |
| 3,403,729 | 10/1968 | Hickey | 15/104.06 A |
| 4,351,079 | 9/1982 | Fitzpatrick | 15/104.06 A |

Primary Examiner—Edward L. Roberts
Attorney, Agent, or Firm—Mildred K. Flowers

[57] ABSTRACT

A sphere launching apparatus for selectively admitting spheres into a pipeline and comprising an angularly disposed support or track for storing a plurality of the spheres thereon, an access port at one end of the track for receiving the spheres therethrough for disposition onto the track, a discharge port at the opposite end of the track for discharging the spheres therefrom and injecting the spheres into the pipeline, the support member being interposed between the access port and discharge port for supporting the spheres in two parallel but offset substantially sequential relationship upon the track, and a release mechanism extending into the proximity of the support or track for alternate engagement with the leading sphere of each of the two parallel sequences thereof for releasing a single sphere at a time for passage through the discharge port for injection into the pipeline.

10 Claims, 10 Drawing Figures

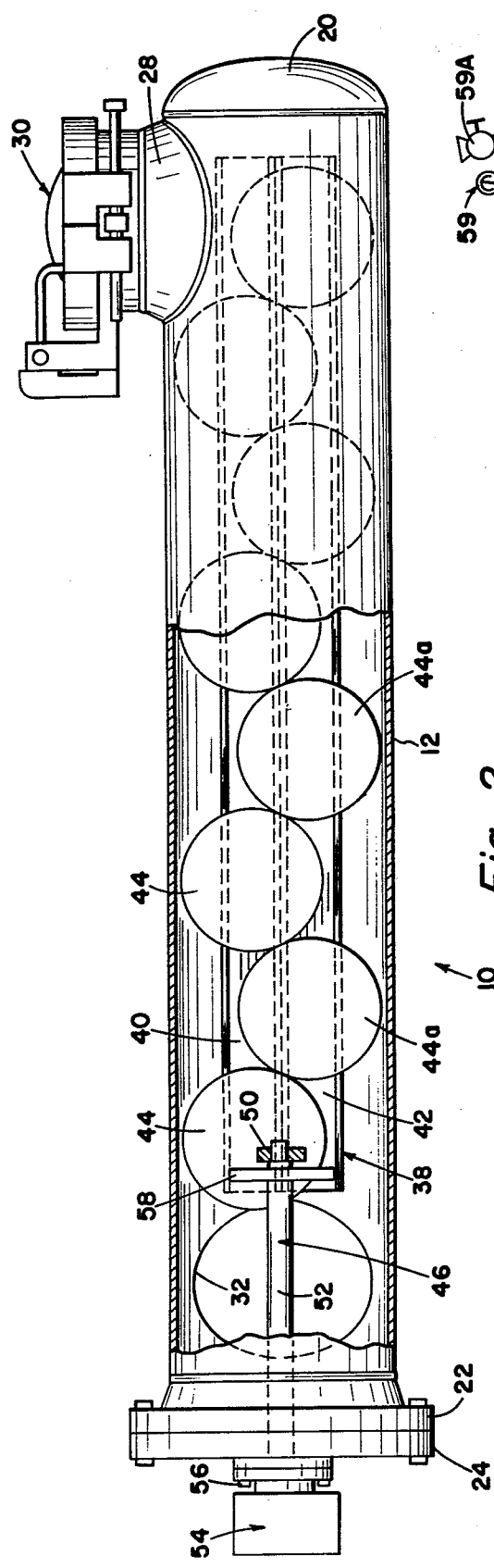
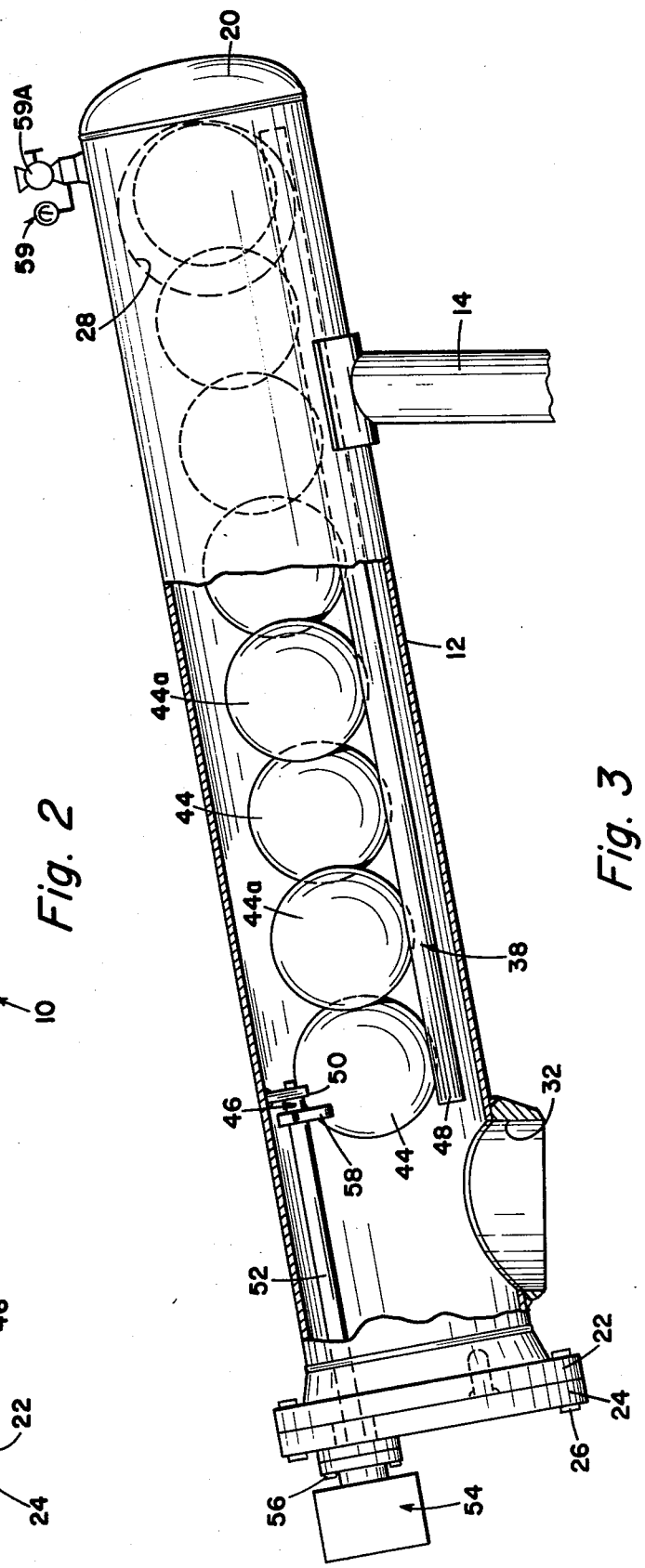
Fig. 2
Fig. 3

SPHERE LAUNCHING APPARATUS

BACKGROUND OF THE INVENTION

1. Field of the Invention

This invention relates to improvements in launching apparatus and more particularly, but not by way of limitation, to a launching device for admitting single spheroids, or the like, into the interior of a pipeline in a sequential relationship.

2. Description of the Prior Art

Pipelines are in widespread usage today for transporting many fluids from one location to another. For example, pipelines are widely used for delivering gas and oil products from the oil well site to the handling or processing plant. The movement of natural gas through a pipeline presents many problems, and one particular problem is the handling of the condensation in the pipeline as the gas stream flows therethrough. The condensation collects in each of hundreds of sags inherent in a pipeline crossing uneven terrain, and the condensate contained within each sag becomes an impediment to the flow of the gas stream through the line. In order to move this condensate through the pipeline it has become the usual practice to move a spheroid, commonly known as a "pig", through the pipeline to force the condensate therethrough. The pig is normally propelled through the pipeline by the pressure of the fluid within the line, such as the gas stream itself, and has proven to be an expedient means for solving the problem.

The pipeline usually comprises a plurality of progressively larger or smaller diameter pipe sections and it is desirable to inject a pig or spheroid at multiple internals along the pipeline in accordance with the diameter variances. In addition, the pipeline may extend through long distances over the country side or open spaces and is frequently unattended. It is, therefore, desirable to provide launching devices at the desired intervals along the pipeline which may be either manually or automatically actuated for injecting the pigs into the interior of the line.

Many devices have been developed for launching the pigs into the pipeline, such as that shown in the Harold N. Eagleton U.S. Pat. No. 3,169,263, issued Feb. 16, 1965, and entitled "Sphere Launching Apparatus". These devices are efficient in operation and solve the problem in a facile manner. However, there are certain disadvantages in the presently available launching devices in that they are normally provided with an integral valve incorporated in the apparatus, or the device must be used in combination with a particular valve, and thus requires the owner of the pipeline to purchase a special valve for installation of the device rather than utilize the normal valves he may have at hand or in stock. Thus, the cost of installation of the launching device is increased and the necessity for the procurement of a special valve may increase the time required for the installation thereof.

SUMMARY OF THE INVENTION

The present invention contemplates a novel sphere launching apparatus particularly designed and constructed for overcoming the foregoing disadvantages. One embodiment of the novel sphere launching device comprises a barrel supported at an angle with respect to the horizontal for supporting a supply of spheres or pigs therein in a manner whereby gravity will facilitate the launching of the pigs into the interior of the pipeline. One end of the barrel is provided with an access port for receiving the pigs therethrough in order to load the pigs into the barrel. The opposite end of the barrel is provided with a discharge port for injecting the pigs into the interior of the pipeline. The discharge port end of the barrel may be secured to or installed on substantially any readily available valve which may be on hand or in stock of the owner of the pipeline, and does not require any special valving for the installation of the barrel. A support means extends longitudinally through the barrel between the access port and discharge port for supporting the spheres therein in mutually parallel rows with the spheres being offset sequentially. A release mechanism is suspended within the barrel for engagement alternately with the leading sphere in each row whereby a single sphere only may be released from the barrel for injection into the pipeline during each launching operation. Gravity maintains the spheres in the barrel in a position wherein the balls or pigs are in engagement with the preceding sphere, and the leading ball in the sequence is in engagement with the release mechanism at all times. When the release mechanism is activated for removal from engagement with the leading sphere in order that the sphere may be launched or injected into the interior of the pipeline, the mechanism simultaneously moves into engagement with the next ball or sphere in the sequence for precluding the release of more than one sphere at a time. The release mechanism may be either manually or automatically actuated as desired, and the launching apparatus is simple and efficient in operation and economical and durable in construction.

Another embodiment of the invention comprises a substantially horizontally disposed sphere storage barrel having a pair of spaced substantially mutually parallel tracks or rails extending longitudinally therethrough for supporting a plurality of spheres within the barrel. The tracks are disposed at an angle with respect to the horizontal whereby the spheres may roll freely therealong by gravity, and the spheres are loaded on one track in staggered relationship with respect to the spheres on the other track. The outer end of the storage barrel is provided with the usual end closure member for permitting access to the interior thereof for removal or insertion of the spheres therein as required, or for any other reason. In addition, a suitable blow down line and valve is provided for the barrel in order to relieve the pressure therein when it is necessary to open the end closure member for any reason. The opposite end of the storage barrel is provided with an outlet which is in communication with the interior of the pipeline through a valve. The valve is in communication with a reducing outlet tee, which has one port thereof in communication with the upstream side of the pipeline, and a second port which is in communication with the downstream side of the pipeline. A launching or releasing mechanism is journalled within the barrel and disposed in the proximity of the outlet for selectively engaging the leading spheroid of each sequence of spheres on the rails and releasing a single sphere at a time for discharge or injection into the pipeline. The substantially horizontal position of the storage barrel facilitates the use of the standard or normal end closure member on the outer end thereof, and eliminates the more difficult cutting and welding operations around the discharge port required in combination with an angularly mounted barrel.

BRIEF DESCRIPTION OF THE DRAWINGS

FIG. 2 is a top view of a sphere launching apparatus embodying the invention, with portions shown in section for purposes of illustration.

FIG. 3 is a side elevational view of a sphere launching apparatus embodying the invention with portions shown in section for purposes of illustration.

FIG. 6A is a view taken on line 6A—6A of FIG. 6.

DESCRIPTION OF THE PREFERRED EMBODIMENTS

Figure 1:
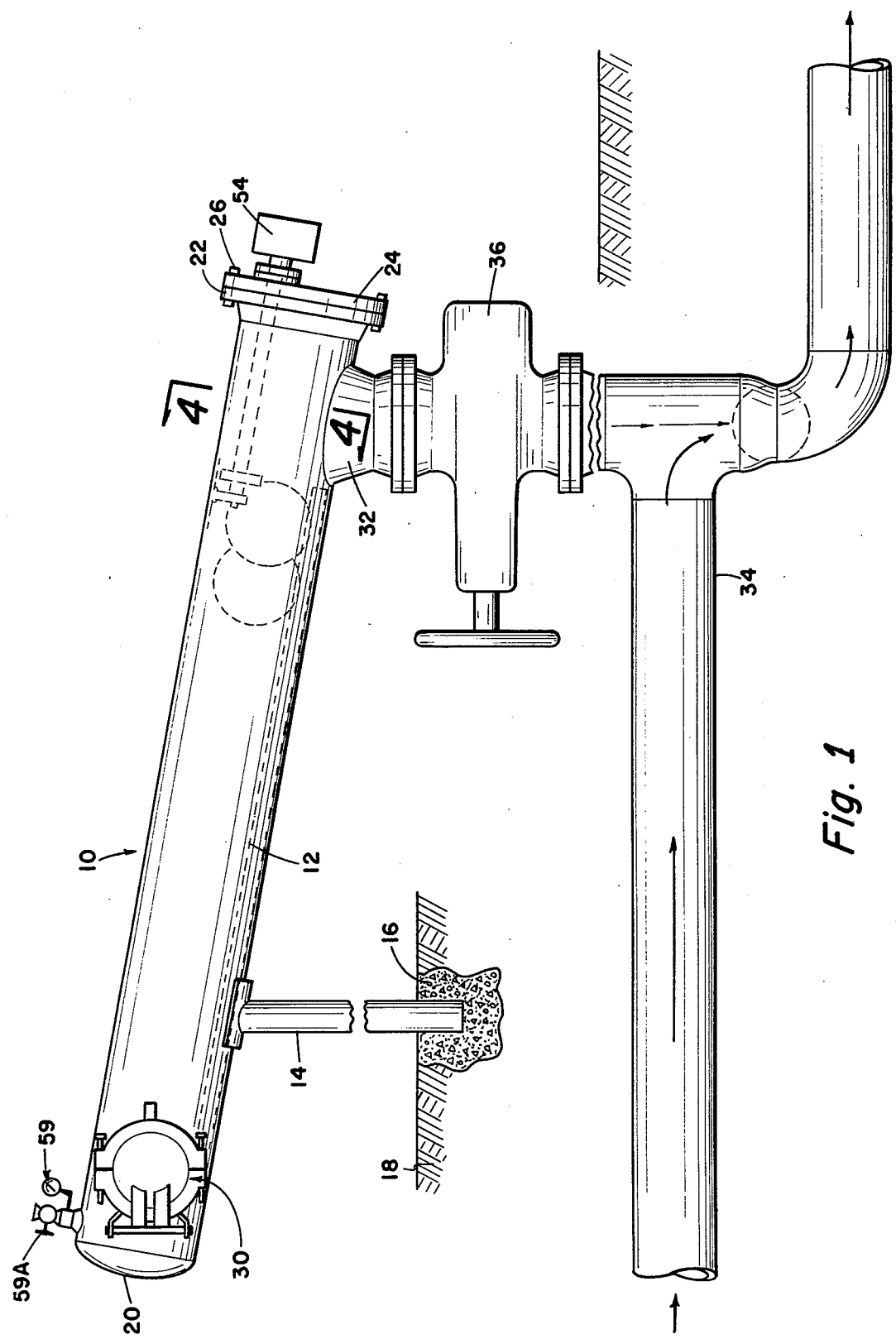
FIG. 1 is a side elevational view of a sphere launching apparatus embodying the invention and installed in combination with a pipeline.

Referring to the drawings in detail, reference character 10 generally indicates a sphere launching apparatus comprising an elongated launching tube or barrel 12 supported by a suitable upright leg member 14 which is preferably embedded in a concrete gase member 16, or the like, disposed in the ground 18. The barrel or launching tube 12 is disposed at an angle with respect to a horizontal plane, as clearly shown in FIGS. 1, 3 and 6, and the recommended angular range thereof is preferably between ten degrees and twenty degrees in order that gravitational force may be utilized in the operation of the apparatus 10, as will be hereinafter set forth. One end of the barrel 12 is preferably closed by a suitable end cap or dome-shaped portion 20, and the opposite end thereof is preferably provided with an outwardly extending circumferential flange 22 having a plate 24 removably secured thereto in any suitable manner, such as by a plurality of bolts 26, as is well known. An access port 28 (FIGS. 2 and 3) is provided in the sidewall of the barrel 12 in the proximity of the closed end 20 thereof having a suitable closure member 30 secured thereto in any desired or well known manner for providing access to the interior of the barrel 12. In addition, a discharge port 32 is provided in the bottom of the barrel 12 in the proximity of the opposite end thereof in communication with the interior of a pipeline 34 through any suitable shut-off valve 36 (FIG. 1) for a purpose as will be hereinafter set forth.

A support member generally indicated as 38 is secured within the barrel 12 in any suitable manner, such as by welding or the like, and extends longitudinally therein between the access port 28 and the discharge port 32 as particularly shown in FIGS. 2 and 3. The support member 38 comprises a pair of channel members 40 and 42 welded together or otherwise secured in side-by-side relation and rigidly secured in the barrel 12 in such a manner that the open ends of the channels are open to the upper side of the barrel. The channels 40 and 42 provide a pair of mutually parallel rails for rollingly supporting a plurality of spheroids 44 and 44a, respectively, in sequential relation. However, the spheroids 44 are offset with respect to the spheroids 44a as will be particularly seen in FIGS. 4 and 5, and for a purpose as will be hereinafter set forth. The support 38 is disposed beneath the access port 28 for initially receiving the spheroids 44 and 44a thereon and terminates in spaced relation to the discharge port 32 for facilitating discharging of the spheroids from the barrel 12.

A release mechanism generally indicated at 46 is secured within the barrel 12 in the proximity of the forward end 48 of the support 38. The release mechanism 46 comprises an apertured flange member 50 which may be welded or otherwise rigidly secured to the inner periphery of the barrel 12 for supporting one end of a rotatable shaft 52 therein. The opposite end of the shaft 52 extends through the plate 24 and is operably connected with a suitable automatic actuator device 54 which may be secured to the outer surface of the plate 24 in any well known manner, such as by a plurality of bolts 56. The actuator 54 may be of any well known type and functions for rotating the shaft 52 about its own longitudinal axis at preselected times or time intervals for activation of the release mechanism 46 when it is desired to inject a spheroid 44 or 44a into the interior of the pipeline 34 as will be hereinafter set forth in detail. An arcuate trigger member 58 is secured to the shaft 52 in any suitable manner for rotation simultaneously therewith. The arcuate configuration of the trigger member 58 is complementary to the contour of the outer periphery of the spheroids 44 and 44a, and the trigger extends substantially radially outwardly from the opposite sides of the shaft 52 as will be particularly seen in FIGS. 4 and 5. It is preferable to provide suitable stop means cooperating with the shaft 52 for limiting the rotation thereof in opposite directions whereby the trigger member 58 may be moved between a first position wherein one outer end thereof is in substantial alignment with the center of the leading spheroid 44, and a second position wherein the opposite outer end of the trigger is in substantial alignment with the center of the leading spheroid 44a.

Figure 4:
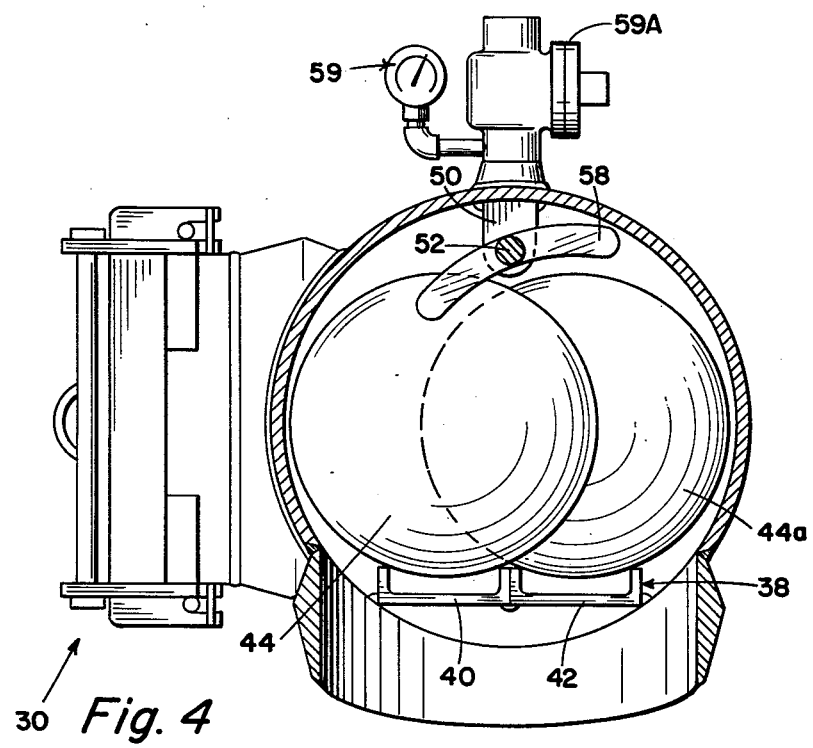
FIG. 4 is a sectional view taken on line 4—4 of FIG. 1.

In the said first position of the trigger member 58, the trigger is in engagement with the leading spheroid 44, as shown in FIG. 4, and thus precludes discharge of any of the spheroids 44 or 44a from the barrel 12. In the second position of the trigger 58, the trigger is in engagement with the leading spheroid 44a and thus precludes discharge of any of the spheroids from the barrel 12. The angular position of the barrel 12 permits gravity to act on the spheroids 44 and 44a whereby all of the spheroids in the barrel are constantly urged in a direction toward the trigger 58, and the engagement of the trigger with the leading spheroids precludes discharge of any of the spheroids from the barrel 12.

Figure 5:
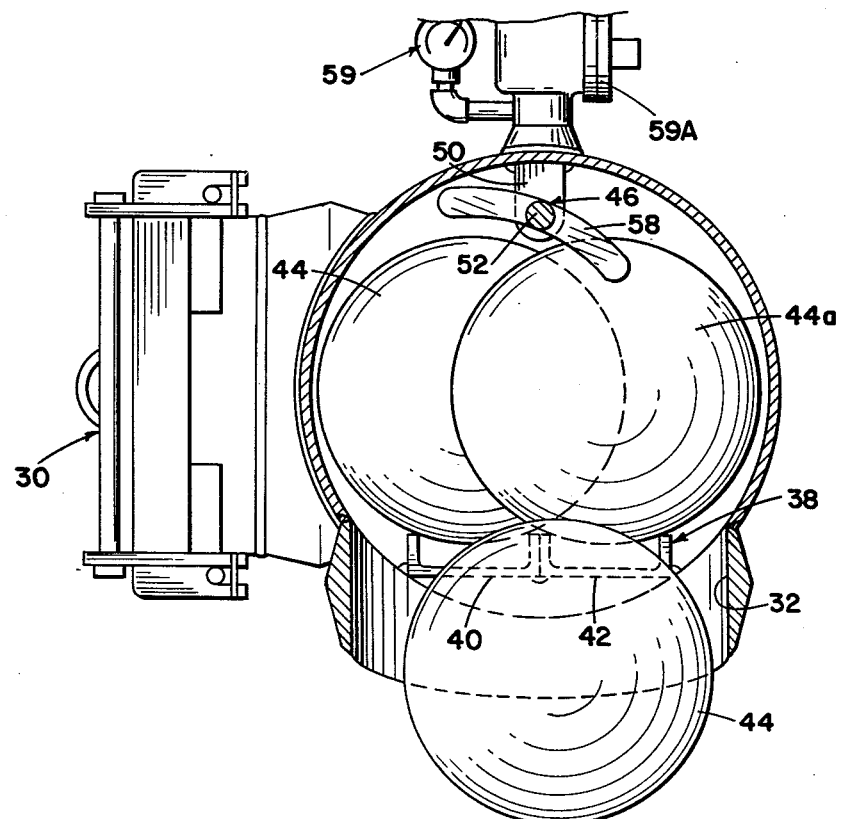
FIG. 5 is a view similar to FIG. 4 illustrating a second position for the release mechanism of a sphere launching apparatus embodying the invention.

As hereinbefore set forth, the arcuate configuration of the trigger member 58 is complementary to the configuration or contour of the outer periphery of the spheroids 44 and 44a, and the inner periphery of the trigger 58 is spaced radially outwardly from the outer periphery of the largest diameter of the spheroids 44 and 44a as shown in FIGS. 4 and 5. Thus, as the trigger 58 is moved between the first and second positions thereof, the first end of the trigger moves away from the leading spheroid, such as the leading spheroid 44, and the spheroid 44 is thus released from any engagement with the trigger 58 whereby gravity causes the released spheroid to fall from the barrel 12 for discharge through the discharge port 32. However, the second end of the trigger 58 is moved into alignment with at least a portion of the leading spheroid 44a prior to the complete release of the trigger from engagement with the spheroid 44. Thus, as the spheroid 44a falls by gravity into a position in the proximity of the trigger member 58, the trigger member 58 precludes any further movement of the spheroid 44a, and the spheroid 44a becomes the leading spheroid in the sequence of spheroids present in the barrel 12.

A suitable pressure gauge generally indicated at 59 may be mounted on the outer periphery of the barrel 12 at substantially any desired location and is in communication with the interior of the barrel 12 for sensing the internal pressure therein. The gauge 59 provides a constant visual indication of the internal pressure in the barrel 12 for a purpose as will be hereinafter set forth.

In operation, the shut off valve 36 is normally in an open position whereby communication is established between the interior of the pipeline 34 and the barrel 12, thus providing an equalization of the pressure therebetween. When it is desired to deliver a spheroid into the pipeline 34 for any reason, the actuator 54 automatically rotates the shaft 52 about its own longitudinal axis for moving the trigger member 58 between the positions shown in FIGS. 4 and 5. Assuming that the trigger 58 is initially in the position shown in FIG. 4, the rotation of the shaft 52 by the actuator 54 moves the trigger from the initial position to the position shown in FIG. 5. As the trigger moves away from engagement with the outer periphery of the spheroid 44, the contour of the trigger 58 is such that there is no further contact with the spheroid 44 and gravity freely acts on the spheroid for dropping thereof through the outlet or discharge port 32. The released spheroid 44 then falls through the valve 36 and into the pipeline 34 wherein the flow stream moving in the pipeline carries the spheroid through the line.

As the leading spheroid 44 leaves the track or support 38, the leading spheroid 44a moves forwardly on the track or support 38 due to gravity, and the forward movement of the spheroid 44a is limited or stopped substantially at the forward end 48 of the track 38 by engagement with the trigger 58, which is approaching the position shown in FIG. 5. As hereinbefore set forth, the contour of the inner periphery of the trigger 58 is selected in complement to the outer configuration of the spheroids in order that the leading spheroid will be disengaged as the trigger 58 is rotated, but the outer end moves into the patch of the next succeeding or oncoming spheroid in the sequence. When the trigger 58 is in the position shown in FIG. 5, the engagement with the leading spheroid 44a will hold the spheroid in position on the support 38, and since each spheroid in the sequence is engaged by the next succeeding spheroid, the entire supply of spheroids within the barrel will be retained from discharge therefrom.

It will be apparent that rotation of the shaft 52 in an opposite direction upon the next activation thereof by the actuator 54 will reverse the rotation of the trigger 58 for releasing the leading spheroid 44a from the barrel and injecting the spheroid into the pipeline, and for simultaneously engaging the next succeeding spheroid 44. In this manner, a single spheroid only is released from the barrel 12 during each activation of the trigger, thus assuring the injection of only a single spheroid at a time into the pipeline.

When the supply of spheroids within the barrel 12 has been depleted, or when it is desirable to gain access to the interior of the barrel 12 for any reason, the valve 36 is closed to isolate the interior of the barrel 12 from the interior of the pipeline 34. The pressure within the barrel 12 may then be relieved or bled off in any suitable manner. For example, a suitable blow-down valve 59A may be provided on the barrel 12 in communication with the interior thereof and which may be opened or actuated in the usual manner for permitting pressure within the barrel to escape, or "blow out" therethrough in a controlled manner. When the pressure within the barrel has been reduced to substantially atmospheric pressure, the closure member may be safely opened completely for providing free access to the interior of the barrel 12. Of course, the pressure existing within the barrel 12 may be visually ascertained by an inspection of the gauge 59, as is well known. When the closure member 30 is opened, a suitable number of spheroids may be dropped therethrough for deposit on the outer or trailing end of the support 38, whereupon gravity will cause the spheroids to move forwardly along the support 38 until the forward movement is limited by engagement with the trigger 58, or with the preceding spheroid present on the support track. When the barrel 12 has thus been reloaded, or it is desirable to return the system to the normal operating condition therefor, the closure member 30 may be replaced or returned to the closed position thereof with respect to the access port 28, and the valve 36 may be reopened for re-establishing communication between the interior of the barrel and the interior of the pipeline, whereupon the operation of the device 10 may proceed as hereinbefore set forth.

Figure 6:
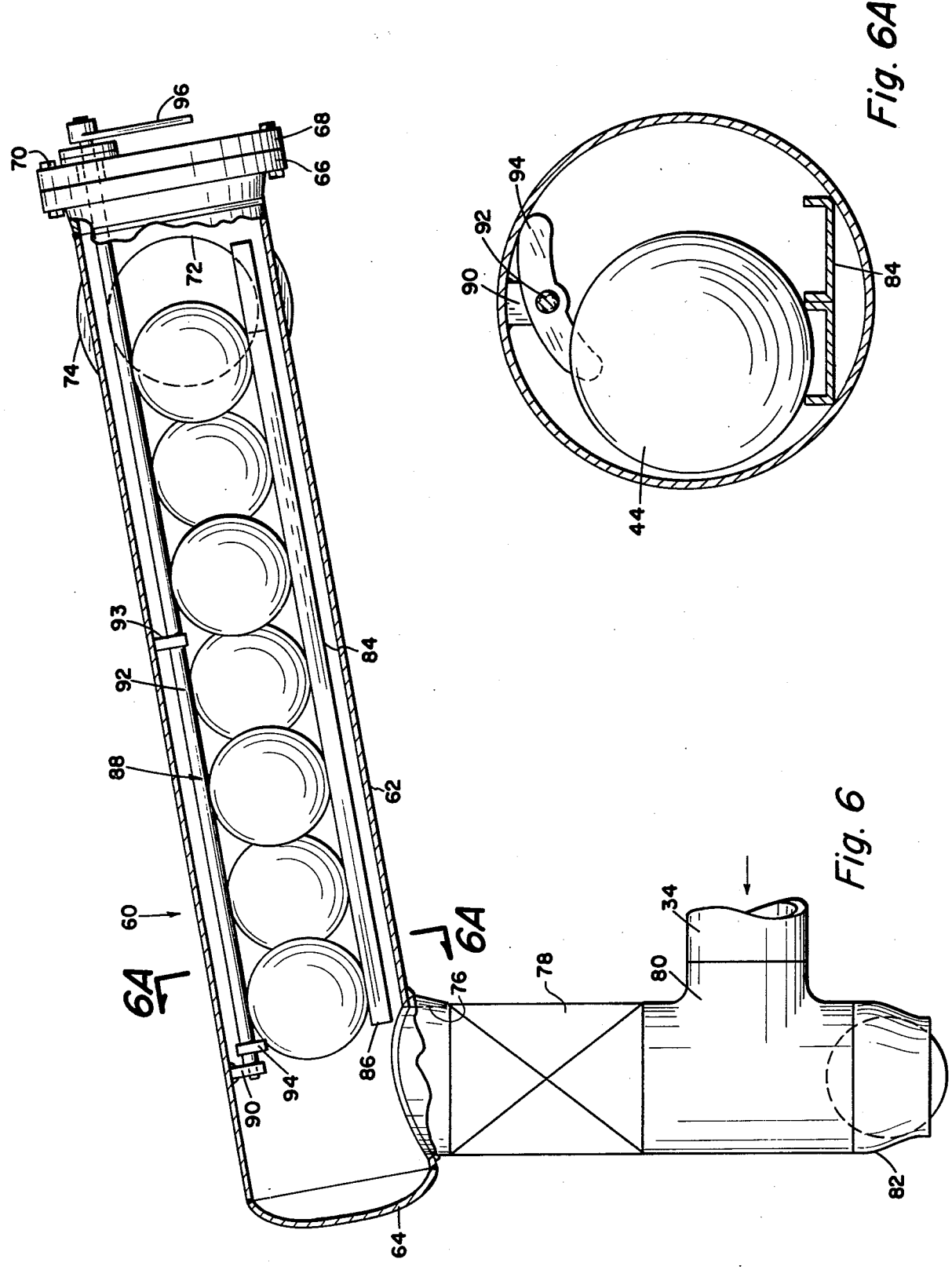
FIG. 6 is a sectional elevational view of a modified sphere launching apparatus embodying the invention with a portion of a pipeline shown in elevation in combination therewith.

Referring now to FIG. 6, a modified sphere launching apparatus is generally indicated at 60 and comprises a barrel 62 similar to the barrel 12 and which may be similarly supported above the ground and disposed at an angle with respect to the horizontal. The forward or leading end of the barrel 62 is closed in any suitable manner as shown at 64, and the opposite end thereof is provided with an outwardly extending circumferential flange 66 for receiving a plate 68 thereagainst. The plate 68 may be removably secured to the flange 66 in any suitable manner, such as by a plurality of bolts 70, for providing access to the interior of the barrel 62. An access port 72 may also be provided in the sidewall of the barrel 62 in the proximity of the flange 66 and a suitable removable cover member or closure member 74 may be removably secured thereto in any well known manner (not shown). A discharge port 76 is provided in the sidewall of the barrel 62 in the proximity of the closed end 64 thereof, and the discharge port 76 may be suitably secured to substantially any shut-off valve 78, which in turn may be secured to a suitable reducing outlet tee fitting 80. The reducing tee 80 may be interposed in the pipeline 34, as is well known, and if desired, a concentric reducer fitting 82 may be secured to the reducing outlet tee 80 to a size corresponding with the pipe sections for facilitating connection of the valve 70 in the pipeline, as is well known.

A support 84 substantially identical to the support 38 is rigidly secured within the barrel 62 with one end thereof disposed in substantial alignment with the access port 74, and the opposite end 86 thereof terminating in substantial alignment with the edge of the discharge port 76 as clearly shown in FIG. 6. A plurality of spheroids 44 and 44a are supported in the barrel by the support 84 in the same manner as in the barrel 12 and on the support 38 as hereinbefore set forth. A manually actuated release mechanism generally indicated at 88 is provided in the barrel 62 for selectively releasing the spheroids 44 and 44a therefrom in the same manner as hereinbefore set forth.

The release mechanism 88 comprises an apertured flange 90 welded or otherwise secured to the inner periphery of the barrel 62 for supporting one end of a rotatable shaft 92. Of course, suitable hanger members 93, or the like, may be suitably secured in spaced along the inner periphery of the barrel 62 for facilitating the support of the longitudinally extending shaft 92, if desired. A trigger member 94, substantially identical to the trigger 58, is secured to the outer periphery of the shaft 92 and functions in the same manner as the trigger 58 upon rotation of the shaft 92 about its own longitudinal axis. The shaft 92 extends longitudinally through the barrel 62 in a direction toward the plate 68 and extends therethrough into connection with a suitable handle or manual actuator lever 96. The lever 96 may be manually rotated in such a manner as to rotate the shaft 92 about its longitudinal axis for rocking the trigger 94 between the first and second positions therefor as hereinbefore set forth in connection with the trigger 58 for selectively releasing a single spheroid 44 or 44a into the pipeline 34. The shaft 92 precludes the spheres from inadvertently moving from one channel to the other during operation of the apparatus 60.

Figure 7:
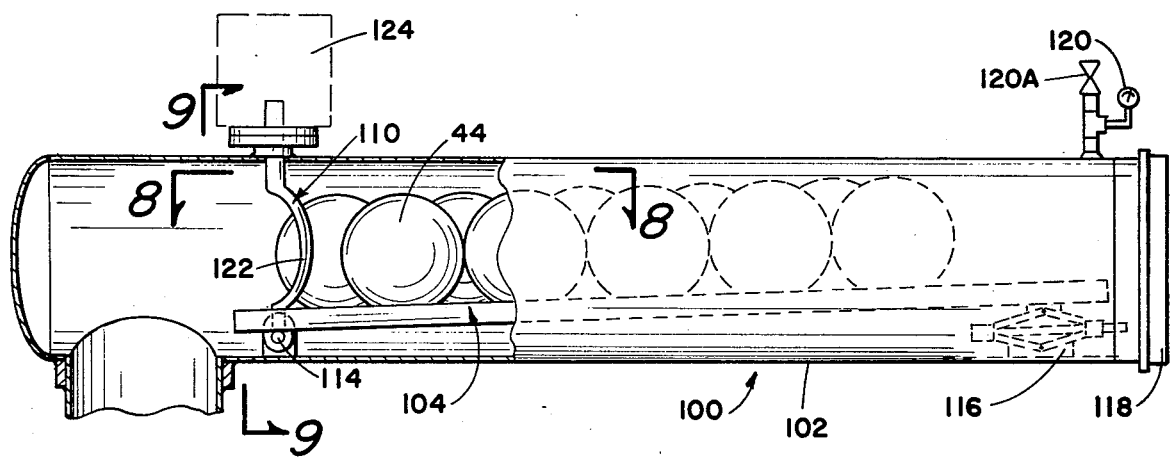
FIG. 7 is a side elevational view, partly in section, of still another modified sphere launching apparatus embodying the invention.
Figure 8:
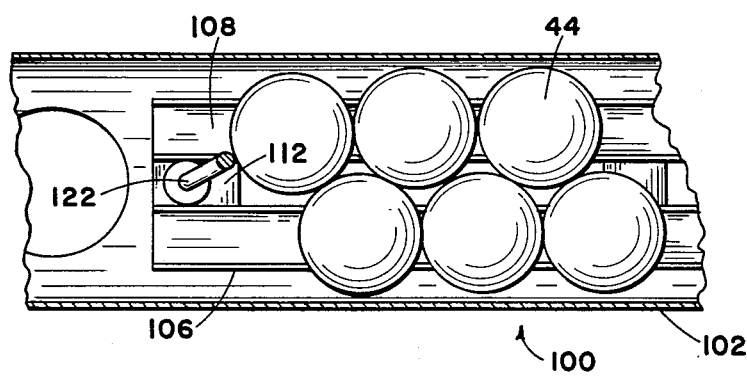
FIG. 8 is a view taken on line 8—8 of FIG. 7.
Figure 9:
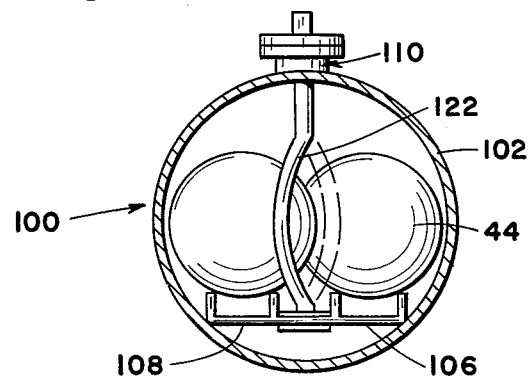
FIG. 9 is a view taken on line 9—9 of FIG. 7.

Referring now to FIGS. 7, 8 and 9, reference character 100 generally indicates still another sphere launching apparatus embodying the invention and comprising a barrel 102 which is similar to the barrels 12 and 62, but which is disposed in a substantially horizontal position, as particularly shown in FIG. 7. A support member 104, generally similar to the support 38, is secured within the barrel 102 and extends longitudinally therethrough in the manner and for the same purpose as hereinbefore set forth. However, the support member 104 comprises a pair of mutually parallel tracks or rails 106 and 108 which are spaced apart for facilitating actuation of a "hoop" type trigger or selector mechanism 110. The forward or leading end of the track 106 and 108 are preferably connected by a suitable cross member 112 which is pivotally secured to the inner periphery of the barrel 102 as shown at 114 in FIG. 7. In this manner the angular orientation or disposition of the support trackes 106 and 108 with respect to the horizontal may be adjusted to provide an overall operation as hereinbefore set forth. A suitable jack member 116 may be disposed within the interior of the barrel in the proximity of the rear end the support 104 for facilitating adjusting of the angular position of the tracks and the jack 116 may be either permanently or removably mounted in the barrel. In the event the jack 116 is removed, it will be apparent that a suitable prop member (not shown) may be installed at the rear end of the support 104 for maintaining the selected angular position thereof.

An access port having a suitable closure member 118 thereon may be provided at the rear end of the barrel 102 for facilitating disposition of the pigs 44 and 44a on the tracks 106 and for providing access to the jack 116. It will be apparent, however, that the access port may be disposed at the forward or front end of the barrel, if desired. In this event, a suitable elongated actuator member (not shown) may be provided for extending longitudinally through the barrel into connection with the jack 116 for actuation thereof. In addition, the selector 110 would have to be actuated each time a spheroid is inserted into the barrel for disposition on the tracks 106 and 108. A suitable gauge 120 and associated blow down valve 120A may be provided in communication with the interior of the barrel 102 for the purpose of determination of the internal pressure of the barrel and relieving the pressure therein, as hereinbefore set forth.

The selector device 110 comprises a substantially hoop-shaped or bow-shaped trigger element 122 extending transversely through the barrel 102, and having the opposite ends thereof journalled therein in any suitable manner for swinging of the hoop 122 from side to side in order to alternately release a single spheroid 44 and 44a at a time from the tracks 106 and 108 as hereinbefore set forth. Of course, the selector 110 may be either manually activated from the exterior of the barrel 102, or a suitable automatic actuator generally indicated at 124 may be operably connected with the trigger for actuation thereof, as is well known.

One advantage of the embodiment of the invention as shown in FIGS. 7 through 9 is the protection of the trigger or launching means. When spheroids are loaded into a barrel having the track or rail means disposed at an angle, with the launching means being disposed at a low point on the track, the spheroids initially engage the track at the access port and roll down the track in a direction toward the launching means. The spheroids are usually somewhat heavy and may gather considerable momentum before they are stopped by the engagement of the launching means or a succeeding spheroid. This may damage the launching means. By placing the tracks in an initial substantially horizontal position, the insertion of the spheroids onto the tracks greatly reduces the forces with which the spheroids engage the launching mechanism, thus greatly reducing damage to the mechanism.

From the foregoing it will be apparent that the present invention provides a novel spheroid launching apparatus comprising a storage barrel for spheroids wherein the spheroids are supported at an angle with respect to the horizontal in order that gravitational forces act on the spheroids for facilitating discharge of the spheroids from the barrel in order to inject the spheroids one at a time into a pipeline. An access port is provided in the barrel for facilitating loading of the spheroids into the barrel and onto support track means whereby the spheroids roll forwardly in the barrel toward the discharge position therefor. A trigger or release mechanism, which may be either of an automatic type actuation or a manual type actuation, is provided for selectively releasing a single spheroid at a time for injection into the pipeline. The launching apparatus may be used in combination with substantially any desired standard or available shut-off valve, and does not require special fittings for installation in conjunction with the pipeline.

Whereas the present invention has been described in particular relation to the drawings attached hereto, it should be understood that other and further modifications, apart from those shown or suggested herein may be made within the spirit and scope of this invention.

What is claimed is:

1. A sphere launching apparatus comprising a non-vertical storage barrel for storing a plurality of sequentially arranged spheres therein, access port means provided on the barrel for loading of the spheres therein, discharge port means provided on the barrel for discharging the spheres therefrom, parallel track means provided in the barrel and extending longitudinally therein for supporting parallel rows of the spheres in mutually offset relation, and selector release means mounted in the interior of barrel for selective engagement with the leading sphere of each row whereby a single sphere at a time may be released for discharge through the discharge port means.

2. A sphere launching apparatus as set forth in claim 1 wherein the barrel is disposed at an angle with respect to the horizontal in order that gravity facilitates the movement of the spheres through the barrel in a direction toward the discharge port.

3. A sphere launching apparatus as set forth in claim 1 wherein the barrel is substantially horizontally disposed, and the track means is supported therein at an angle with respect to the horizontal whereby gravity facilitates the movement of the sphere through the barrel in a direction toward the discharge port.

4. A sphere launching apparatus as set forth in claim 1 and including pressure gauge means in communication with the interior of the barrel for providing a visual determination of the internal pressure of the barrel.

5. A sphere launching apparatus as set forth in claim 1 and including blow-down valve means in communication with the interior of the barrel for relieving the pressure therein when desired.

6. A sphere launching apparatus as set forth in claim 1 wherein the track means comprises a pair of substantially U-shaped channel members each having one leg in abutting relationship with the leg of the other and providing mutually parallel tracks for supporting the two parallel rows of spheres.

7. A sphere launching apparatus as set forth in claim 1 wherein the track means comprises a pair of spaced substantially U-shaped channel members extending longitudinally within the barrel in mutually parallel relationship and providing mutually parallel tracks for supporting the two parallel rows of spheres.

8. A sphere launching apparatus as set forth in claim 1 wherein the selector release means comprises a substantially box-shaped release member extending transversely through the barrel and journalled therein for pivotal movement between positions of alternate engagement with the leading sphere of each row of spheres whereby a single sphere is released at a time for discharge from the discharge port means upon said pivotal movement.

9. A sphere launching apparatus comprising a storage barrel for storing a plurality of sequentially arranged spheres therein, access port means provided on the barrel for loading of the spheres therein, discharge port means provided on the barrel for discharging the spheres therefrom, parallel track means provided in the barrel and extending longitudinally therein for supporting parallel rows of the spheres in mutually offset relation, and selector release means provided in the barrel for selective engagement with the leading sphere of each row whereby a single sphere at a time may be released for discharge through the discharge port means, and wherein the selector release means comprises a trigger member rotatably supported within the barrel and having an arcuate configuration complementary to the outer configuration of the spheres whereby in one position of the trigger member one end thereof engages the leading sphere of one of the rows for limiting movement of all the following spheres in a direction toward the discharge port means, a second position of the trigger member releases the leading sphere of one of the rows for release through the discharge means, and a third position of the trigger member engages the leading spere in the other of said rows for limiting movement of all the following spheres in a direction toward the discharge port means.

10. A sphere launching apparatus comprising a storage barrel for storing a plurality of sequentially arranged spheres therein, access port means provided on the barrel for loading of the spheres therein, discharge port means provided on the barrel for discharging the spheres therefrom, parallel track means provided in the barrel and extending longitudinally therein for supporting parallel rows of the spheres in mutually offset relation, and selector release means provided in the barrel for selective engagement with the leading sphere of each row whereby a single sphere at a time may be released for discharge through the discharge port means, and including jack means disposed within the barrel and engagable with one end of the track means for supporting the track means at an angle with respect to the horizontal whereby gravity facilitates the movement of the spheres in a direction toward the discharge port.

* * * * *